(12) United States Patent
Kozono

(10) Patent No.: US 12,497,037 B2
(45) Date of Patent: Dec. 16, 2025

(54) DRIVING ASSISTANCE APPARATUS, DRIVING ASSISTANCE METHOD, AND NON-TRANSITORY RECORDING MEDIUM

(71) Applicant: SUBARU CORPORATION, Tokyo (JP)

(72) Inventor: Kazuya Kozono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 169 days.

(21) Appl. No.: 18/467,048

(22) Filed: Sep. 14, 2023

(65) Prior Publication Data

US 2024/0123985 A1 Apr. 18, 2024

(30) Foreign Application Priority Data

Oct. 12, 2022 (JP) ................................. 2022-164087

(51) Int. Cl.
*B60W 30/095* (2012.01)
*G08G 1/16* (2006.01)

(52) U.S. Cl.
CPC ......... *B60W 30/0956* (2013.01); *G08G 1/166* (2013.01); *B60W 2554/4041* (2020.02)

(58) Field of Classification Search
CPC ............... B60W 30/09; B60W 30/095; B60W 30/0956; G08G 1/166
See application file for complete search history.

(56) References Cited

U.S. PATENT DOCUMENTS

| 11,433,922 B1* | 9/2022 | Van Heukelom .... G05D 1/0221 |
| 2020/0327809 A1* | 10/2020 | Ji ........................... G08G 1/052 |
| 2021/0114629 A1* | 4/2021 | Komuro ............ B60W 30/0956 |

FOREIGN PATENT DOCUMENTS

JP  2017-84115 A  5/2017

* cited by examiner

*Primary Examiner* — Anshul Sood
(74) *Attorney, Agent, or Firm* — Rimon P.C.

(57) ABSTRACT

A driving assistance apparatus is configured to control a contact avoidance operation of avoiding contact between a first vehicle to which the driving assistance apparatus is to be applied and a second vehicle. The driving assistance apparatus includes an electronic control unit. The electronic control unit is configured to: make a prediction of a position of the second vehicle at a determination time as a determination predicted position, based on a position of the second vehicle at a past time before the determination time; calculate a deviation amount of the prediction, based on the determination predicted position and a determination detected position that is a position of the second vehicle detected at the determination time; and suppress the contact avoidance operation when the deviation amount is greater than a setting value.

12 Claims, 9 Drawing Sheets

DRIVING ASSISTANCE APPARATUS, DRIVING ASSISTANCE METHOD, AND NON-TRANSITORY RECORDING MEDIUM

CROSS-REFERENCE TO RELATED APPLICATIONS

The present application claims priority from Japanese Patent Application No. 2022-164087 filed on Oct. 12, 2022, the entire contents of which are hereby incorporated by reference.

BACKGROUND

The disclosure relates to a driving assistance apparatus, a driving assistance method, and a non-transitory recording medium that control a contact avoidance operation of avoiding contact between a vehicle and a target vehicle.

In recent years, a large number of vehicles are mounted with a driving assistance apparatus. The driving assistance apparatus may be configured to perform various operations. A driving assistance operation for a contact avoidance operation of avoiding contact with a target vehicle is effective in improving safety.

Japanese Unexamined Patent Application Publication (JP-A) No. 2017-84115 discloses a driving assistance apparatus that performs an assistance control for avoidance of contact of a vehicle. The driving assistance apparatus in JP-A No. 2017-84115 predicts a position of a target vehicle to determine a possibility of contact, and performs a contact avoidance operation by changing a traveling state, for example, reducing or increasing a speed of the own vehicle.

SUMMARY

An aspect of the disclosure provides a driving assistance apparatus configured to control a contact avoidance operation of avoiding contact between a first vehicle to which the driving assistance apparatus is to be applied and a second vehicle. The driving assistance apparatus includes an electronic control unit. The electronic control unit is configured to: make a prediction of a position of the second vehicle at a determination time as a determination predicted position, based on a position of the second vehicle at a past time before the determination time; calculate a deviation amount of the prediction, based on the determination predicted position and a determination detected position that is a position of the second vehicle detected at the determination time; and suppress the contact avoidance operation when the deviation amount is greater than a setting value.

An aspect of the disclosure provides a driving assistance method configured to control a contact avoidance operation of avoiding contact between a first vehicle to which the driving assistance method is to be applied and a second vehicle. The driving assistance method includes: storing a position of the second vehicle; making, based on the stored position, a prediction of a position of the second vehicle at a determination time as a determination predicted position; calculating a deviation amount of the prediction, based on the determination predicted position and a determination detected position that is a position of the second vehicle detected at the determination time; and suppressing the contact avoidance operation when the deviation amount is greater than a setting value.

An aspect of the disclosure provides a non-transitory computer readable recording medium containing a program. The program causes, when executed by a computer, the computer to implement a method configured to control a contact avoidance operation of avoiding contact between a first vehicle to which the method is to be applied and a second vehicle. The method includes: storing a position of the second vehicle; making, based on the stored position, a prediction of a position of the second vehicle at a determination time as a determination predicted position; calculating a deviation amount of the prediction, based on the determination predicted position and a determination detected position that is a position of the second vehicle detected at the determination time; and suppressing the contact avoidance operation when the deviation amount is greater than a setting value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
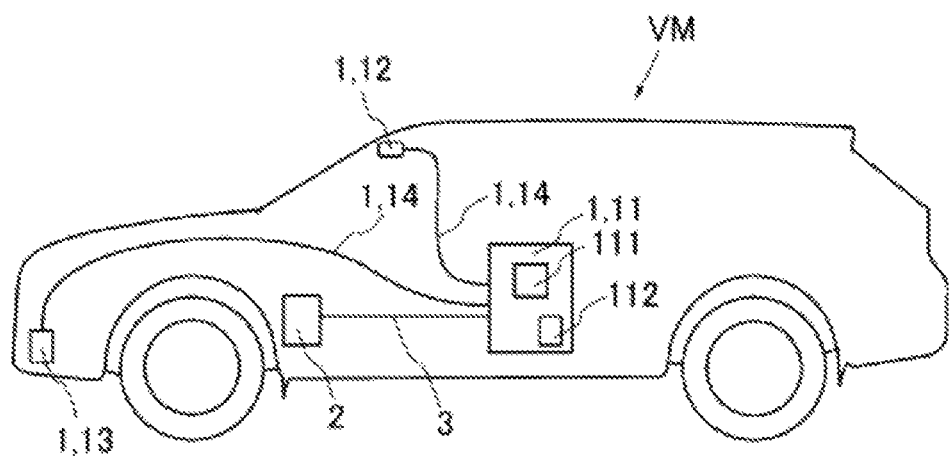
FIG. 1 is a diagram illustrating a vehicle including a driving assistance apparatus.

A driving assistance apparatus in JP-A No. 2017-84115 predicts a position of a target vehicle to determine a possibility of contact, but it is difficult to determine whether the target vehicle comes into contact with an own vehicle. If an erroneous determination is made, an unnecessary contact avoidance operation such as braking can be performed though there is no risk of contact, which can be inconvenient for a user.

It is desirable to provide a driving assistance apparatus and a driving assistance method that make it possible to suppress an unnecessary contact avoidance operation to avoid inconvenience for a user, and a non-transitory recording medium containing a program that makes it possible to execute such a driving assistance method.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a configuration of a vehicle VM including a driving assistance apparatus 1 according to an example embodiment of the disclosure. The vehicle VM may serve as an own vehicle. In example embodiments of the disclosure, the vehicle VM may perform a contact avoidance operation of avoiding contact with a target vehicle VC. In one embodiment, the vehicle VM may serve as a "first vehicle". In one embodiment, the target vehicle VC may serve as a "second vehicle". The contact avoidance operation may be, for example, changing a traveling state, such as reducing or increasing a speed of the vehicle VM, or rotating a steering wheel to change a traveling direction. As illustrated in FIG. 1, the vehicle VM may include the driving assistance apparatus 1. The driving assistance apparatus 1 may include an electronic control unit (ECU) 11, cameras 12, radar sensors 13, and a signal line 14. The cameras 12 and the radar sensors 13 may detect the target vehicle VC. The signal line 14 may couple the ECU 11 to the cameras 12 and the radar sensors 13. Two cameras 12 may be arranged in a left-right direction on an inside of an upper part of a windshield. One radar sensor 13 may be disposed on each of the left and the right at the front of the vehicle VM. The ECU 11 may detect a position of the target vehicle VC by using images obtained by the cameras 12 and data detected by the radar sensors 13, sent from the signal line 14. The vehicle VM may also include a traveling state changing device 2. Examples of the traveling state changing device 2 may include an automatic braking device, an engine, an automatic steering device, and an alarm sounding device. Based on a control signal received from the ECU 11 via a control line 3, the traveling state changing device 2 may change the traveling state, for example, reduce or increase the speed, or rotate the steering wheel to change the traveling direction.

Figure 2:
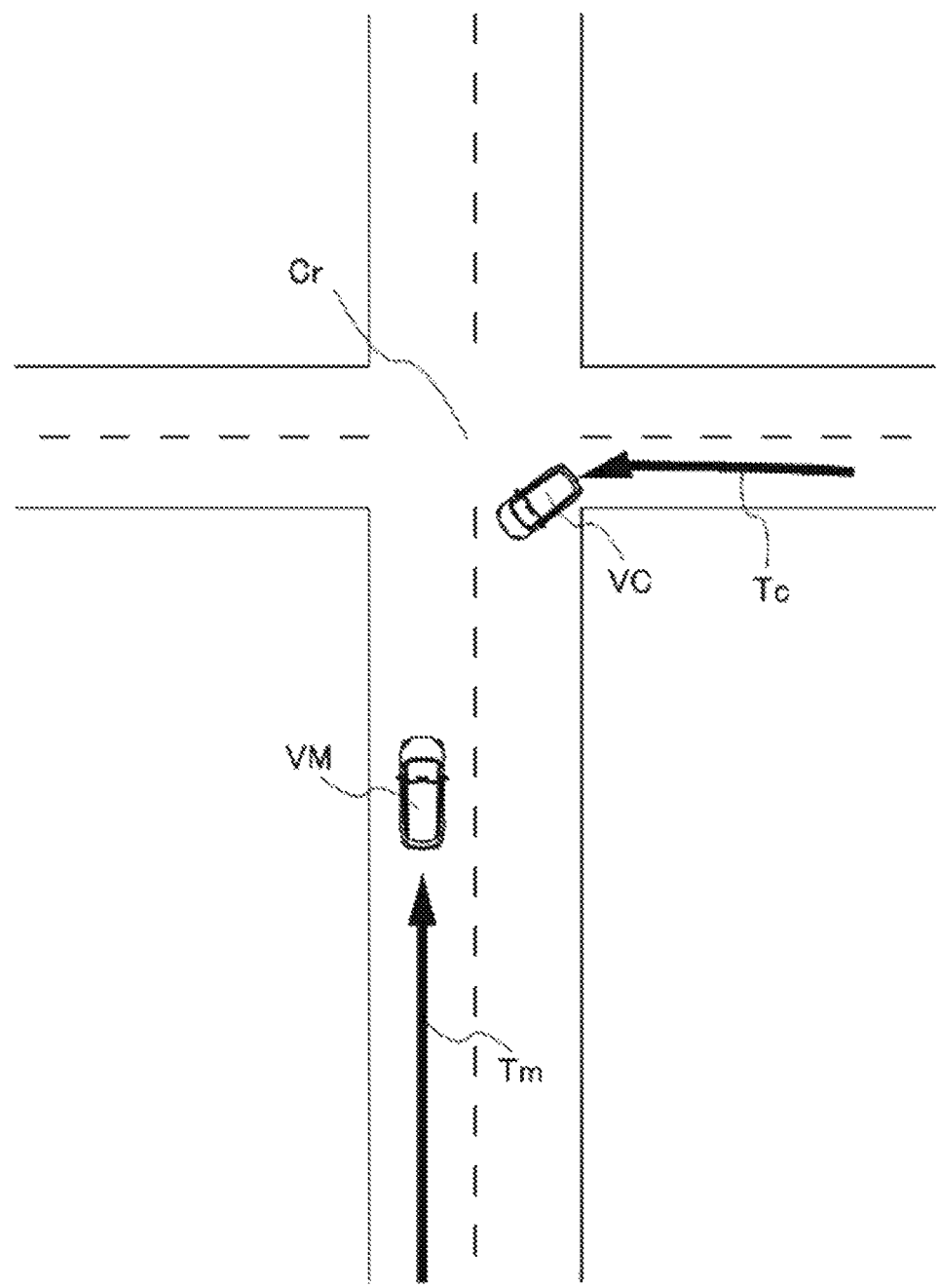
FIG. 2 is a diagram illustrating traveling of the vehicle and a target vehicle at an intersection.

FIG. 2 illustrates a situation in which the vehicle VM including the driving assistance apparatus 1 is about to enter an intersection Cr. In FIG. 2, the vehicle VM travels straight through the intersection Cr, and the target vehicle VC makes a left turn at the intersection Cr, on the right of the vehicle VM. Arrows indicate traveling paths. The traveling path of the vehicle VM is denoted by an own vehicle traveling path Tm, and the traveling path of the target vehicle VC is denoted by a target vehicle traveling path Tc.

In the driving assistance apparatus 1 of the vehicle VM, the images obtained by the cameras 12 and the data detected by the radar sensors 13 may be transmitted to the ECU 11 via the signal line 14. The ECU 11 may detect the target vehicle VC from the images, and calculate a relative position of the target vehicle VC as viewed from the vehicle VM. In addition, in the ECU 11, software held in a memory 112 and a central processing unit (CPU) 111 may work to calculate an absolute position, a direction, and the speed of the vehicle VM, based on data obtained from, for example, an unillustrated vehicle sensor of the vehicle VM. By using the position, the direction, and the speed of the vehicle VM, the ECU 11 may calculate an absolute position of the target vehicle VC, based on the relative position with respect to the target vehicle VC. The CPU 111 and the memory 112 may configure a computer.

In the ECU 11, the CPU 111 may operate the software held in the memory 112. Thus, when the ECU 11 predicts that the target vehicle VC comes into contact with the vehicle VM, based on the absolute positions, directions, and speeds of the target vehicle VC and the vehicle VM, the ECU 11 may activate and cause, for example, the automatic braking device to perform the contact avoidance operation. However, it is difficult to predict and determine whether the target vehicle VC comes into contact with the vehicle VM because, for example, the predicted position and speed can have an error. If erroneous prediction and determination are made, for example, unnecessary braking can be activated though there is no risk of contact, which can be inconvenient for a user.

Hence, the ECU 11 predicts the position of the target vehicle VC at a determination time as a determination predicted position, by using past data before the determination time. The ECU 11 compares the determination predicted position with a determination detected position that is the position of the target vehicle VC detected at the determination time. When a deviation amount of the prediction is greater than a setting value, the ECU 11 suppresses the contact avoidance operation. In the example embodiment, when the deviation amount is greater than the setting value, the ECU 11 may suppress the contact avoidance operation, for example, prevent the contact avoidance operation from being performed, even if the ECU 11 predicts contact.

First Example Embodiment

[When Target Vehicle VC Travels while Turning]

Figure 3:
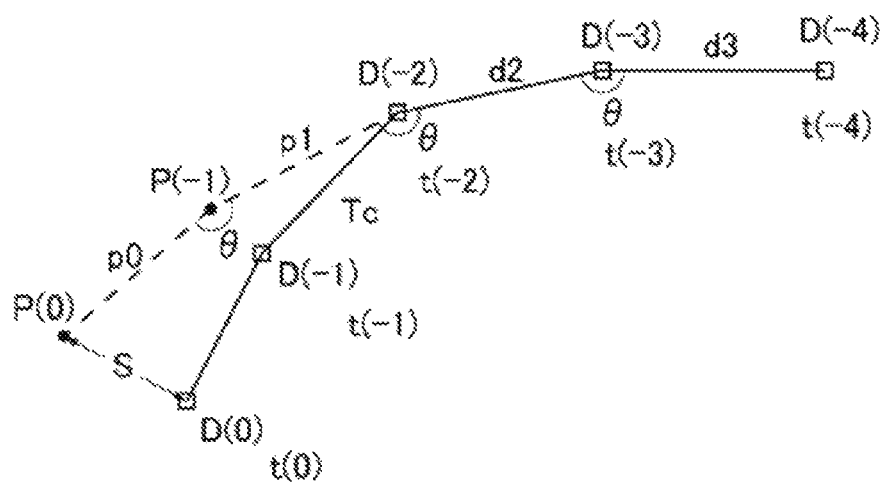
FIG. 3 is a diagram illustrating a path of a detected position and a path of a predicted position when the target vehicle travels while turning according to one example embodiment.

FIG. 3 illustrates a path of a detected position D and a path of a predicted position P when the target vehicle VC travels while turning. The path of the detected position D is indicated by a solid line, and the path of the predicted position P is indicated by a dotted line. Also in later-described drawings including paths, the paths are indicated by solid lines and dotted lines. The detected position D and the predicted position P may be absolute positions, and directions of movement may also be absolute directions. The path of the detected position D may be the target vehicle traveling path Tc. By using the position, the direction, and the speed of the vehicle VM, the detected position D and the predicted position P may be calculated based on the relative position with respect to the target vehicle VC based on the images obtained by the cameras 12 and the data detected by the radar sensors 13.

In a first example embodiment, the ECU 11 may calculate the position of the target vehicle VC at a time t(n) every predetermined cycle. The ECU 11 may calculate a curvature and the speed based on the position of the target vehicle VC at past three times t(−4), t(−3), and t(−2). The curvature and the speed may be used for prediction. In addition, a predicted position P(n) may be used for prediction and determination of contact. In FIG. 3, when a deviation distance S that is the deviation amount between a determination detected position D(0) and a determination predicted position P(0) calculated by prediction at a determination time t(0) is greater than a setting value Sth, the ECU 11 may suppress the contact avoidance operation.

The determination predicted position P(0) may be obtained in the following manner. The ECU 11 may calculate three positions of the target vehicle VC from the four-cycles earlier time t(−4) to the two-cycles earlier time t(−2). Note that the detected position D(n) and the predicted position P(n) may indicate the detected position and the predicted position at the time t(n). Based on coordinates of the calculated detected positions D(−4) to D(−2), the ECU 11 may calculate an angle θ that is formed by a line segment D(−4)–D(−3) coupling the detected position D(−4) and the detected position D(−3) and a line segment D(−3)–D(−2) coupling the detected position D(−3) and the detected position D(−2). In addition, the ECU 11 may calculate a ratio γ by using an expression (1), based on a length d3 of the line segment D(−4)–D(−3) and a length d2 of the line segment D(−3)–D(−2).

$$\gamma = d2/d3 \quad (1)$$

Based on the ratio γ obtained using the expression (1), the ECU 11 may calculate a length p1 of a line segment D(−2)–P(−1) by using an expression (2).

$$p1 = \gamma \cdot d2 \quad (2)$$

Furthermore, the ECU 11 may calculate a length p0 of a line segment P(−1)–P(0) by using an expression (3).

$$p0 = \gamma \cdot p1 \quad (3)$$

In addition, based on the coordinates of the detected position D(−4), the detected position D(−3), and the detected position D(−2), the ECU 11 may calculate the angle θ formed by the line segment D(−4)–D(−3) and the line segment D(−3)–D(−2). The ECU 11 may assume the angle θ as both an angle formed by the line segment D(−3)–D(−2) and the line segment D(−2)–P(−1), and an angle formed by the line segment D(−2)–P(−1) and the line segment P(−1)–P(0).

In this manner, based on the coordinates of the detected position D(−2) at the time t(−2), the ECU 11 may calculate the determination predicted position P(0) at the time t(0), by using the lengths p1 and p0 and the angle θ. This makes it possible to calculate the deviation distance S that is a distance between the determination detected position D(0) and the determination predicted position P(0).

Figure 4:
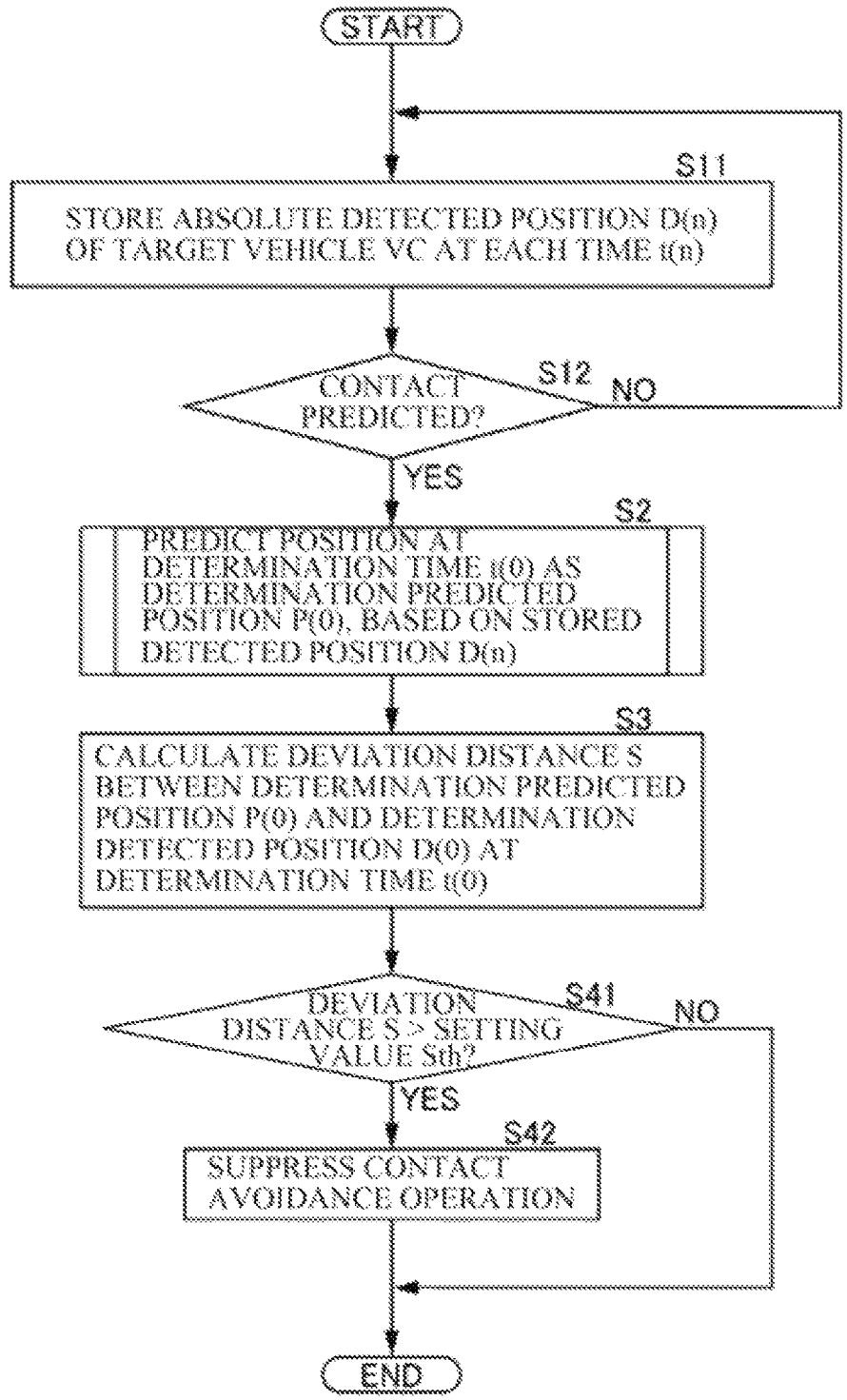
FIG. 4 is a flowchart illustrating a process according to one example embodiment.
Figure 5:
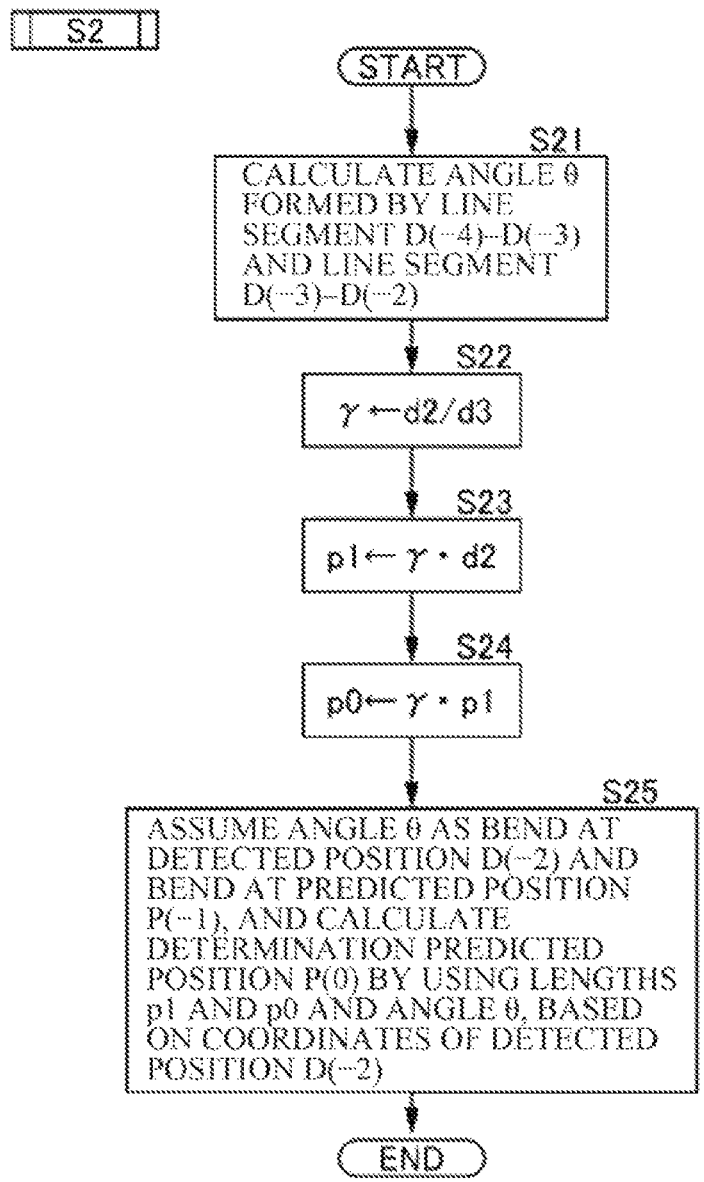
FIG. 5 is a flowchart illustrating a process of calculating the predicted position according to one example embodiment.

Next, description is given of a control of suppressing the contact avoidance operation, with reference to flowcharts in FIGS. 4 and 5. Steps of the flowcharts indicate a driving assistance method. This control may be executed by the ECU 11 by the CPU 111 performing processing in accordance with a program held in the memory 112. This program may be held in a non-transitory computer readable recording medium.

When the driving assistance apparatus 1 recognizes the target vehicle VC based on the images obtained by the cameras 12 and the data detected by the radar sensors 13, as illustrated in FIG. 4, the ECU 11 may calculate and store the absolute detected position D(n) of the target vehicle VC in a first step (step S11). This storing may be periodically performed until the driving assistance apparatus 1 of the vehicle VM predicts contact (step S12). Thus, at a time when contact is predicted, the absolute detected position D(n) of the target vehicle VC at each time t(n) before that time may be held in the memory 112. In a subsequent second step, the ECU 11 may predict the position at the determination time t(0) as the determination predicted position P(0), based on the detected position D(n) stored in the memory 112 (step S2). In a third step, the ECU 11 may calculate the deviation amount of the prediction, e.g., the deviation distance S that is the distance between the determination predicted position P(0) and the determination detected position D(0) (step S3). In a fourth step, the ECU 11 may determine whether the deviation distance S is greater than the setting value Sth (step S41). If the deviation distance S is greater than the setting value Sth (YES in step S41), the ECU 11 may suppress the contact avoidance operation (step S42). If the deviation distance S is not greater than the setting value Sth (NO in step S41), the ECU 11 may end the process.

The absolute detected position D(n) of the target vehicle VC at each time t(n), obtained in step S11, may be data to be used for determination of contact with the vehicle VM. The detected position D(n) may be calculated as the absolute position of the target vehicle VC, based on the images obtained by the cameras 12 and the data detected by the radar sensors 13, and the absolute position, the direction, and the speed of the vehicle VM obtained by, for example, the vehicle sensor of the vehicle VM.

In step S2, the ECU 11 may perform steps illustrated in FIG. 5. First, the ECU 11 may calculate the angle θ formed by the line segment D(−4)–D(−3) and the line segment D(−3)–D(−2) (step S21). In addition, the ECU 11 may obtain the ratio γ by dividing the length d2 of the line segment D(−3)–D(−2) by the length d3 of the line segment D(−4)–D(−3) (step S22). The ECU 11 may multiply the length d2 by the ratio γ to obtain the length p1 (step S23). The ECU 11 may also multiply the length p1 by the ratio γ to obtain the length p0 (step S24). The ECU 11 may assume the angle θ as a bend at the detected position D(−2) and a bend at the predicted position P(−1). Based on the coordinates of the detected position D(−2), the ECU 11 may calculate the determination predicted position P(0) by using the lengths p1 and p0 and the angle θ (step S25).

When the deviation distance S is large, it is predicted that the target vehicle VC has made a sharp turn, and that the risk of contact has decreased. In addition, accuracy of contact prediction has decreased. In such a case, it is possible to suppress the contact avoidance operation by the steps described above. As an example of suppression of the contact avoidance operation, even when contact is predicted, the ECU 11 may prevent the contact avoidance operation such as automatic braking, automatic steering, or alarm sounding from being performed. By preventing the contact avoidance operation from being performed, an unnecessary contact avoidance operation is prevented, making it possible to avoid inconvenience for the user.

In another example, even when contact is predicted, the ECU 11 may delay the contact avoidance operation. For example, when the ECU 11 determines that contact occurs within 1 second, in driving assistance of suppressing the contact avoidance operation, the ECU 11 may shorten 1 second to 0.7 seconds if the deviation amount is greater than the setting value. This allows for a change from a control of causing the contact avoidance operation to be performed 1 second before the predicted timing of contact to a control of causing the contact avoidance operation to be performed 0.7 seconds before the predicted timing of contact, which delays the contact avoidance operation. By delaying the contact avoidance operation, an unnecessary contact avoidance operation is prevented with high accuracy, making it possible to avoid inconvenience for the user.

[When Target Vehicle VC Travels Straight]

Figure 6:
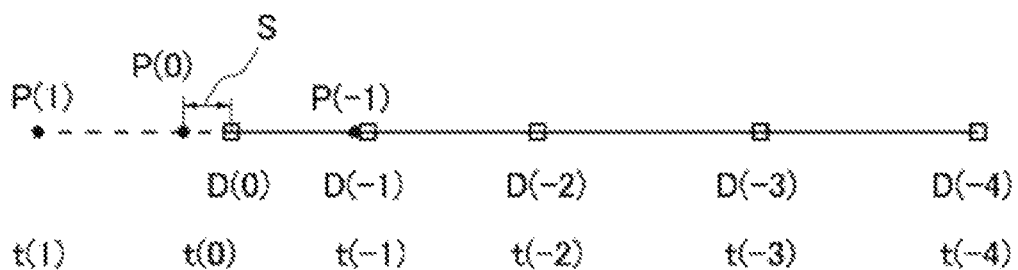
FIG. 6 is a diagram illustrating the path of the detected position and the path of the predicted position when the target vehicle undergoes braking without turning according to one example embodiment.

FIG. 3 illustrates a situation in which the target vehicle VC turns. A case where the target vehicle VC travels straight is illustrated in FIG. 6. FIG. 6 illustrates a situation in which the target vehicle VC decelerates under braking. Also in such a case, the ECU 11 may obtain the ratio $\gamma$, calculate the determination predicted position P(0) at the determination time t(0), calculate the deviation distance S with respect to the actual determination detected position D(0), and suppress the contact avoidance operation.

In suppression of the contact avoidance operation based on the deviation distance S according to the first example embodiment, it is possible to determine whether to suppress the contact avoidance operation, based on a magnitude of deviation of the predicted position of the target vehicle based on prediction. Accordingly, it is possible to appropriately determine whether to suppress the contact avoidance operation, when the predicted position is deviated due to an avoidance operation by braking or turning by the target vehicle.

Modification Example

Figure 7:
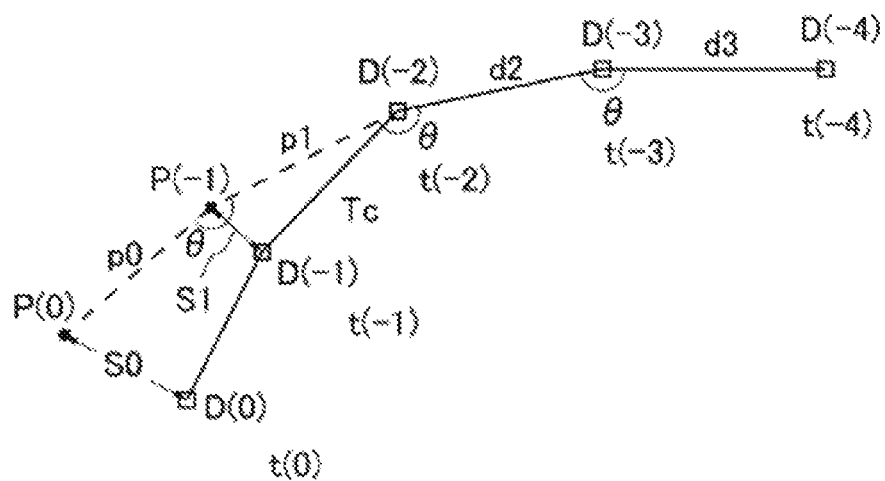
FIG. 7 is a diagram illustrating the path of the detected position and the path of the predicted position according to a modification example of one example embodiment.

In the first example embodiment, the contact avoidance operation may be suppressed when the deviation distance S between the determination detected position D(0) and the determination predicted position P(0) at the determination time t(0) is greater than the setting value Sth. In some embodiments, the contact avoidance operation may be suppressed when the deviation distance S is greater than the setting value Sth at multiple determination times. FIG. 7 illustrates the path of the detected position and the path of the predicted position according to a modification example. Used in the modification example may be two determination times of the determination time t(0) and a determination time t(−1) that is one cycle earlier than the determination time t(0). At the determination time t(0), the ECU 11 may calculate a deviation distance S0 between the determination detected position D(0) and the determination predicted position P(0). In addition, at the determination time t(−1), the ECU 11 may calculate a deviation distance S1 between the determination detected position D(−1) and the determination predicted position P(−1).

The ECU 11 may suppress the contact avoidance operation, based on that both the deviation distance S0 and the deviation distance S1 are greater than the setting value Sth, i.e., the deviation distance is greater than the setting value twice. Even if the deviation distance S0 is greater than the setting value Sth, the ECU 11 may not suppress the contact avoidance operation when the deviation distance S1 is not greater than the setting value Sth. According to the modification example, even if the setting value Sth is a value smaller than in the first example embodiment, it is possible to suppress an unnecessary contact avoidance operation while preventing excessive suppression.

In the modification example, the contact avoidance operation may be suppressed when the deviation amount is greater than the setting value a predetermined number of times, e.g., twice. In some embodiments, the predetermined number of times may be three or more times.

In the first example embodiment, the absolute position may be stored to be used to calculate the determination predicted position P(0), but the relative position may be stored to be used to calculate the determination predicted position P(0). In addition, not only the position but also the speed and the direction at each time t(n) may be stored to be used to calculate the determination predicted position P(0).

Second Example Embodiment

Figure 8:
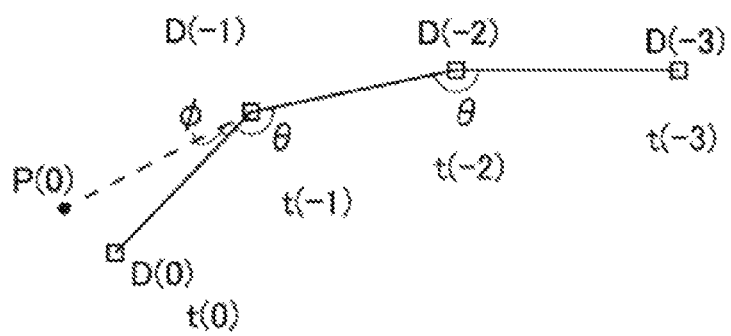
FIG. 8 is a diagram illustrating the path of the detected position and the path of the predicted position when the target vehicle travels while turning according to one example embodiment.

In the first example embodiment, the deviation distance S may be used as the deviation amount of the prediction. In some embodiments, a deviation angle $\varphi$ may be used as the deviation amount of the prediction. FIG. 8 illustrates the path of the detected position D and the path of the predicted position P in a case where the deviation angle $\varphi$ is used as the deviation amount according to a second example embodiment. In the second example embodiment, the ECU 11 may suppress the contact avoidance operation, when a difference in angle between the path of the detected position D and the path of the predicted position P from the one-cycle earlier time t(−1) to the determination time t(0) becomes greater than a setting value $\varphi$th. In one example, the ECU 11 may suppress the contact avoidance operation, when the deviation angle $\varphi$ between a detection direction that is a direction of the determination detected position D(0) and a prediction direction that is a direction of the determination predicted position P(0) is greater than the setting value $\varphi$th.

Figure 9:
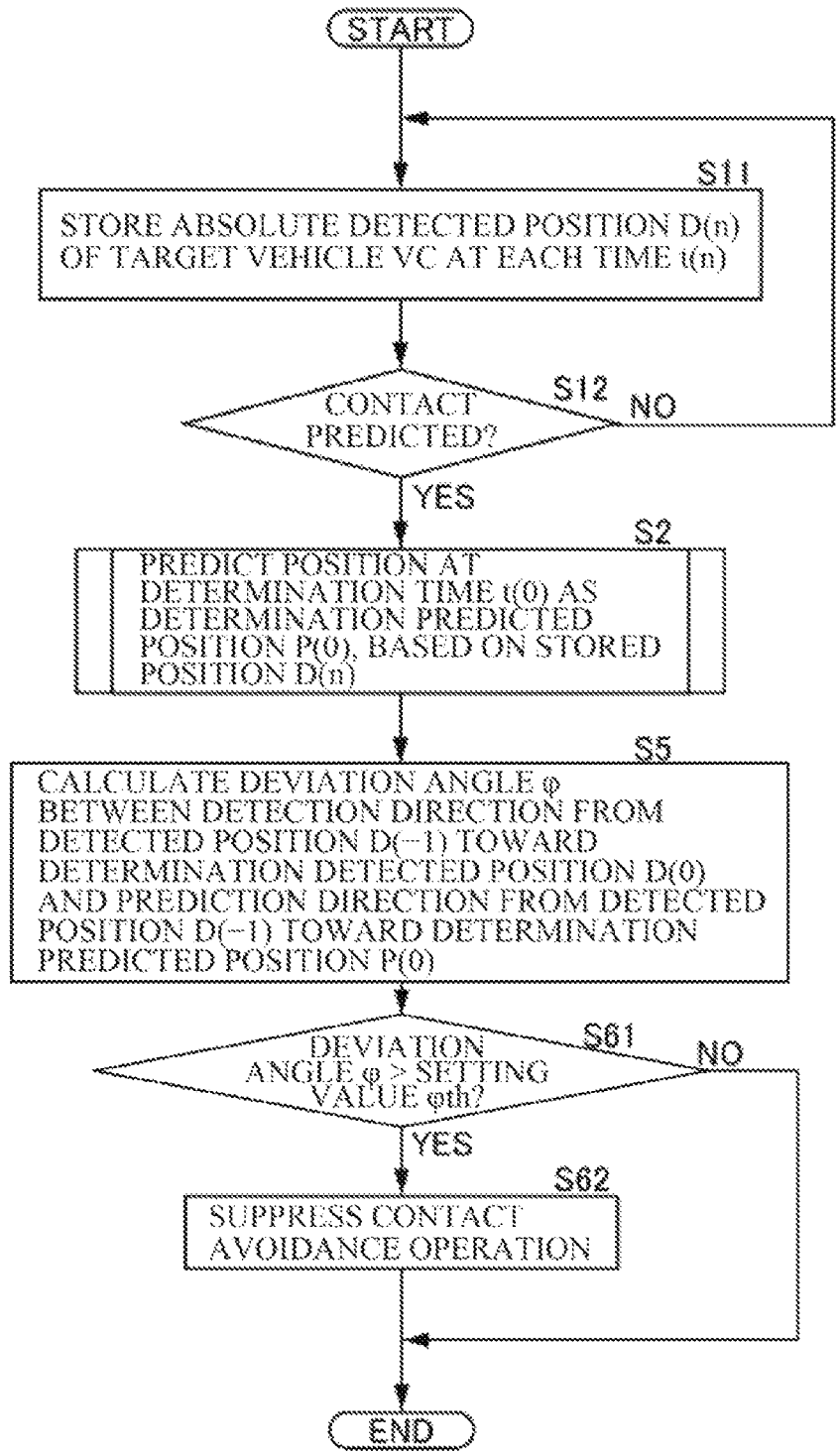
FIG. 9 is a flowchart illustrating a process according to one example embodiment.

Next, description is given of a control of suppressing the contact avoidance operation, with reference to a flowchart in FIG. 9. Steps of the flowcharts indicate the driving assistance method. This control may be executed by the ECU 11 by the CPU 111 performing processing in accordance with a program held in the memory 112. This program may be held in the non-transitory computer readable recording medium.

When the driving assistance apparatus 1 recognizes the target vehicle VC based on the images obtained by the cameras 12 and the data detected by the radar sensors 13, the ECU 11 may calculate and store the absolute detected position D(n) of the target vehicle VC in the first step (step S11). This storing may be periodically performed until the driving assistance apparatus 1 of the vehicle VM predicts contact (step S12). Thus, at the determination time t(0) when contact is predicted, the absolute detected position D(n) of the target vehicle VC at each time t(n) before the time t(0) may be held in the memory 112. In the subsequent second step, the ECU 11 may predict the position at the determination time t(0) as the determination predicted position P(0), based on the detected position D(n) stored in the memory 112 (step S2). These steps may be similar to those in the first example embodiment.

In the second example embodiment, in the third step, the ECU 11 may calculate the deviation angle $\varphi$ between the detection direction and the prediction direction (step S5), as illustrated in FIG. 9. The detection direction may be the direction of a line segment D(−1)–D(0) directed from the detected position D(−1) at the time t(−1) one cycle before the determination time t(0), toward the determination detected position D(0) at the determination time t(0). The prediction direction may be the direction of a line segment D(−1)–P(0) directed from the detected position D(−1) toward the determination predicted position P(0). In the fourth step, the ECU 11 may determine whether the deviation angle $\varphi$ is greater than the setting value $\varphi$th (step S61). If the deviation angle $\varphi$ is greater than the setting value $\varphi$th (YES in step S61), the ECU 11 may suppress the contact avoidance operation (step S62). Also in such a case, it is expected that the target vehicle VC is attempting to avoid the vehicle VM by steering. If the deviation angle φ is not greater than the setting value φth (NO in step S61), the ECU 11 may end the process.

Modification Example

In the second example embodiment, used as the deviation angle φ may be the angle between the line segment D(−1)−D(0) and the line segment D(−1)−P(0). The line segment D(−1)−D(0) may be directed from the detected position D(−1) at the time t(−1) one cycle before the determination time t(0), toward the determination detected position D(0) at the determination time t(0). The line segment D(−1)−P(0) may be directed from the detected position D(−1) toward the determination predicted position P(0). In some embodiments, used as the deviation angle φ may be an angle formed between a line segment directed from the detected position at a multiple-cycles earlier time toward the determination detected position D(0) at the determination time t(0), and a line segment directed from that detected position toward the determination predicted position P(0).

Figure 10:
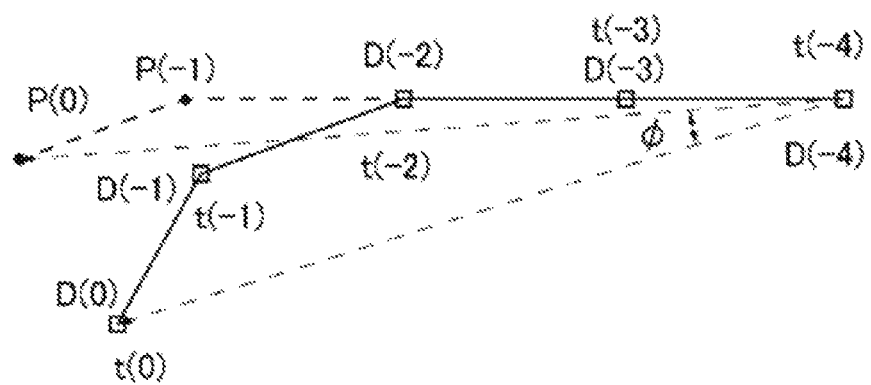
FIG. 10 is a diagram illustrating the path of the detected position and the path of the predicted position when the target vehicle travels while turning according to a modification example of one example embodiment.

In a modification example illustrated in FIG. 10, the angle formed at the detected position D(−4) at the four-cycles earlier time t(−4) may be used as the deviation angle (p. In FIG. 10, used as the deviation angle φ may be the angle between the detection direction and the prediction direction. The detection direction may be the direction of the line segment D(−4)−D(0) directed from the detected position D(−4) toward the determination detected position D(0). The prediction direction may be the direction of the line segment D(−4)−P(0) directed from the detected position D(−4) toward the determination predicted position P(0). When the deviation angle φ exceeds the setting value φth, the ECU 11 may suppress the contact avoidance operation.

In suppression of the contact avoidance operation based on the deviation angle φ according to the second example embodiment, it is possible to determine whether to suppress the contact avoidance operation, based on a magnitude of deviation of the direction of the target vehicle based on prediction. Accordingly, it is possible to appropriately determine whether to suppress the contact avoidance operation, when the predicted direction is deviated due to an avoidance operation by turning by the target vehicle.

The deviation distance S may be used as the deviation amount of the prediction in the first example embodiment, and the deviation angle φ may be used as the deviation amount of the prediction in the second example embodiment. In some embodiments, the driving assistance may be performed by using both the deviation distance S in the first example embodiment and the deviation angle φ in the second example embodiment. For example, when the deviation angle φ becomes larger, the setting value Sth of the deviation distance S may be made smaller. In another example, when the deviation distance S becomes larger, the setting value φth of the deviation angle φ may be made smaller. Using both the deviation distance S and the deviation angle φ makes it possible to determine whether to suppress the contact avoidance operation more accurately.

Third Example Embodiment

Figure 11:
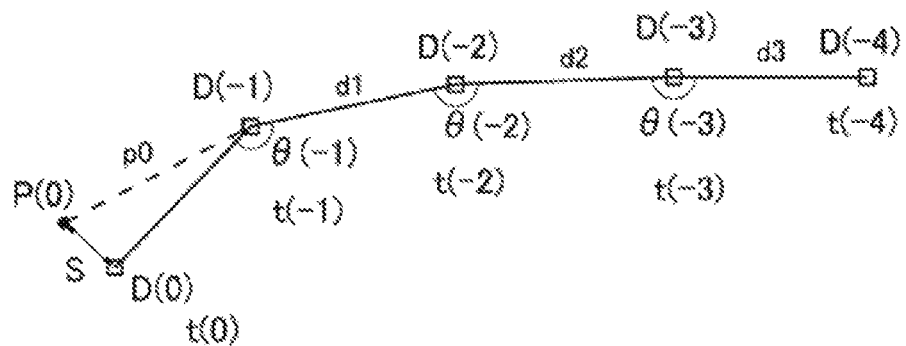
FIG. 11 is a diagram illustrating the path of the detected position and the path of the predicted position when the target vehicle travels while turning according to one example embodiment.

In a third example embodiment, the curvature and the speed may be calculated to be used for prediction, based on the position of the target vehicle VC at past four times. The third example embodiment may be applied in a case where contact is predicted based on a clothoid curve when the target vehicle VC rotates the steering wheel at a constant speed. The ECU 11 may calculate a change rate Δθ in angle between an angle θ(−3) and an angle θ(−2) illustrated in FIG. 11, by using an expression (4).

$$\Delta\theta = \theta(-2)/\theta(-3) \qquad (4)$$

The ECU 11 may predict θ(−1) by using an expression (5).

$$\theta(-1) = \Delta\theta \cdot \theta(-2) \qquad (5)$$

The length of the line segment corresponding to the speed of the target vehicle VC may be obtained in a manner similar to that in the first example embodiment.

Figure 12:
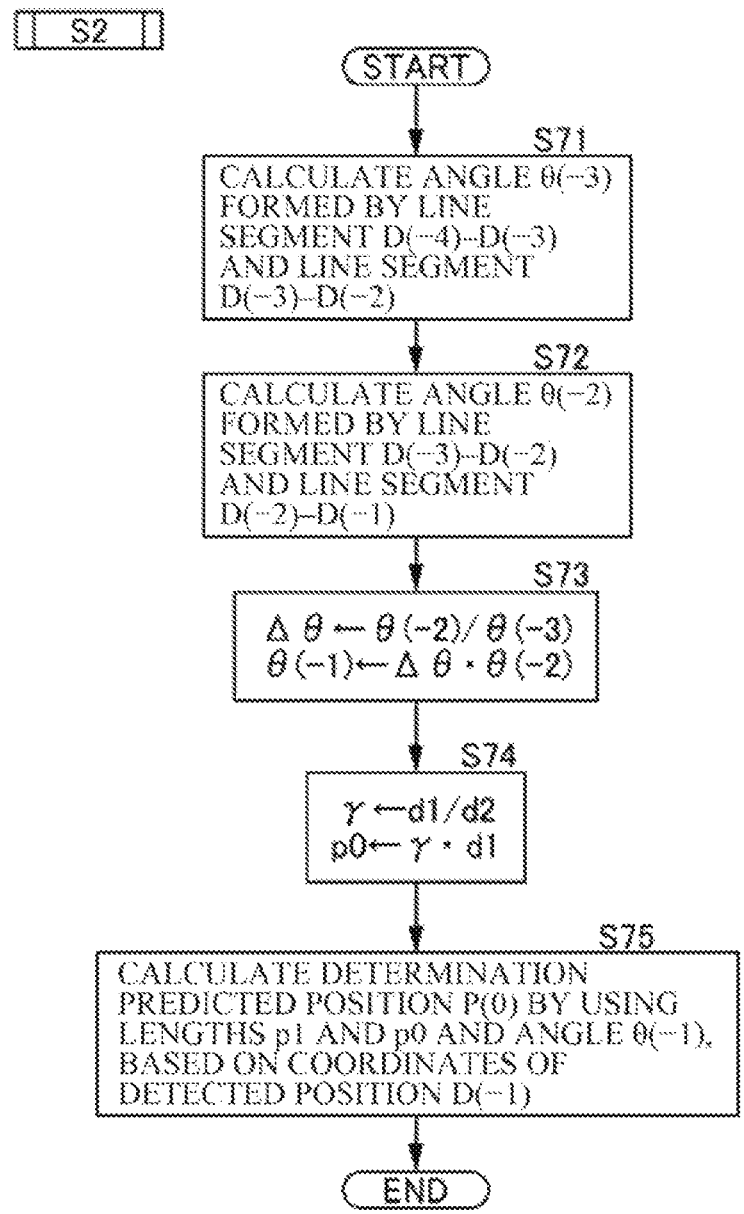
FIG. 12 is a flowchart illustrating a process of calculating the predicted position according to one example embodiment.

In the third example embodiment, in the second step in the first example embodiment, the ECU 11 may predict the predicted position P(0) in the following manner as illustrated in FIG. 12. The ECU 11 may calculate the angle θ(−3) formed by the line segment D(−4)−D(−3) and the line segment D(−3)−D(−2) (step S71). In addition, the ECU 11 may calculate the angle θ(−2) formed by the line segment D(−3)−D(−2) and a line segment D(−2)−D(−1) (step S72). The ECU 11 may divide the angle θ(−2) by the angle θ(−3) to obtain the change rate Δθ, and multiply the angle θ(−2) by the change rate Δθ to obtain an angle θ(−1) (step S73). The ECU 11 may also divide a length d1 by the length d2 to obtain the ratio γ, and multiply the length d1 by the ratio γ to obtain the length p0 (step S74). Based on the coordinates of the detected position D(−1), the ECU 11 may calculate the determination predicted position P(0) by using the lengths p1 and p0 and the angle θ(−1) (step S75).

In the third example embodiment, the deviation distance S may be calculated by one prediction. As in the first example embodiment, the ECU 11 may calculate the deviation distance S, and determine whether to suppress the contact avoidance operation.

Also in the third example embodiment, the determination predicted position P(0) may be calculated based on prediction over multiple cycles. In addition, the change rate Δθ may be used in the third example embodiment, but a change rate Δd may be obtained regarding a change in length to be used to calculate the determination predicted position P(0). In addition, as in the second example embodiment, the deviation angle φ may be used as the deviation amount to determine whether to suppress the contact avoidance operation.

In addition, in the example embodiments, the position, etc. of the target vehicle VC may be detected based on data obtained from the cameras 12 and the radar sensors 13. In some embodiments, the position, etc. of the target vehicle VC may be detected based on data obtained from either the cameras 12 or the radar sensors 13. The position, etc. of the target vehicle VC may be detected based on data obtained from all or a portion of the cameras 12, the radar sensors 13, and other devices.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In a situation in which a target vehicle turns or undergoes sudden braking, a possibility of contact decreases. Accordingly, according to at least one embodiment of the disclosure, such a situation is quickly detected, and a contact avoidance operation is suppressed by, for example, delaying or cancelling control intervention. This makes it possible to suppress an unnecessary contact avoidance operation, making it possible to avoid inconvenience for a user.

As used herein, the term "collision" may be used interchangeably with the term "contact".

The ECU 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 11 illustrated in FIG. 1.

The invention claimed is:

1. A driving assistance apparatus for a first vehicle, the driving assistance apparatus comprising an electronic control unit configured to:
   recognize a second vehicle;
   store a history of detected positions of the second vehicle, the detected positions being obtained prior to a determination time at which a contact between the first vehicle and the second vehicle is predicted;
   predict the contact between the first vehicle and the second vehicle at the determination time, based on the stored history;
   predict, upon predicting the contact, a determination predicted position of the second vehicle at the determination time based on the stored history, and detect a determination detected position of the second vehicle at the determination time;
   calculate a deviation amount between the determination predicted position and the determination detected position; and
   suppress a contact avoidance operation that is planned upon predicting the contact, when the deviation amount is greater than a setting value.

2. The driving assistance apparatus according to claim 1, wherein the electronic control unit is configured to suppress the contact avoidance operation when the deviation amount is greater than the setting value a predetermined number of times.

3. The driving assistance apparatus according to claim 2, wherein the deviation amount comprises a distance between the determination detected position and the determination predicted position.

4. The driving assistance apparatus according to claim 2, wherein the deviation amount comprises a deviation angle between a detection direction that is a direction of the determination detected position and a prediction direction that is a direction of the determination predicted position.

5. The driving assistance apparatus according to claim 2, wherein the suppressing comprises preventing the contact avoidance operation from being performed.

6. The driving assistance apparatus according to claim 2, wherein the suppressing comprises delaying the contact avoidance operation.

7. The driving assistance apparatus according to claim 1, wherein the deviation amount comprises a distance between the determination detected position and the determination predicted position.

8. The driving assistance apparatus according to claim 1, wherein the deviation amount comprises a deviation angle between a detection direction that is a direction of the determination detected position and a prediction direction that is a direction of the determination predicted position.

9. The driving assistance apparatus according to claim 1, wherein the suppressing comprises preventing the contact avoidance operation from being performed.

10. The driving assistance apparatus according to claim 1, wherein the suppressing comprises delaying the contact avoidance operation.

11. A driving assistance method for controlling a contact avoidance operation of avoiding contact between a first vehicle to which the driving assistance method is to be applied and a second vehicle, the driving assistance method comprising:
    recognizing a second vehicle;
    storing a history of detected positions of the second vehicle, the detected positions being obtained prior to a determination time at which a contact between the first vehicle and the second vehicle is predicted;
    predicting the contact between the first vehicle and the second vehicle at the determination time, based on the stored history;
    predicting, upon predicting the contact, a determination predicted position of the second vehicle at the determination time based on the stored history, and detect a determination detected position of the second vehicle at the determination time;
    calculating a deviation amount between the determination predicted position and the determination detected position; and
    suppressing the contact avoidance operation that is planned upon predicting the contact, when the deviation amount is greater than a setting value.

12. A non-transitory computer readable recording medium containing a program, the program causing, when executed by a computer, the computer to implement a method for controlling a contact avoidance operation of avoiding contact between a first vehicle to which the method is to be applied and a second vehicle, the method comprising:
    recognizing a second vehicle;
    storing a history of detected positions of the second vehicle, the detected positions being obtained prior to a determination time at which a contact between the first vehicle and the second vehicle is predicted;
    predicting the contact between the first vehicle and the second vehicle at the determination time, based on the stored history;
    predicting, upon predicting the contact, a determination predicted position of the second vehicle at the determination time based on the stored history, and detect a determination detected position of the second vehicle at the determination time;
    calculating a deviation amount between the determination predicted position and the determination detected position; and storing a position of the second vehicle;
making, based on the stored position, a prediction of a position of the second vehicle at a determination time as a determination predicted position;
calculating a deviation amount of the prediction, based on the determination predicted position and a determination detected position that is a position of the second vehicle detected at the determination time; and
suppressing the contact avoidance operation that is planned upon predicting the contact, when the deviation amount is greater than a setting value.

* * * * *